(12) United States Patent
Tanabe et al.

(10) Patent No.: US 7,060,127 B2
(45) Date of Patent: Jun. 13, 2006

(54) SILICA-CALCIUM CARBONATE COMPOSITE PARTICLES

(75) Inventors: Katsuyuki Tanabe, Tokyo (JP); Kouhei Mitsuhashi, Tokyo (JP)

(73) Assignee: Nittetsu Mining Co., Ltd., Tokyo (JP)

( * ) Notice: Subject to any disclaimer, the term of this patent is extended or adjusted under 35 U.S.C. 154(b) by 191 days.

(21) Appl. No.: 10/204,532

(22) PCT Filed: Mar. 2, 2001

(86) PCT No.: PCT/JP01/01614

§ 371 (c)(1),
(2), (4) Date: Aug. 20, 2002

(87) PCT Pub. No.: WO01/64585

PCT Pub. Date: Sep. 7, 2001

(65) Prior Publication Data

US 2003/0029590 A1 Feb. 13, 2003

(30) Foreign Application Priority Data

Mar. 3, 2000 (JP) .............................. 2000-058272

(51) Int. Cl.
*C09C 1/02* (2006.01)
(52) U.S. Cl. ................ 106/465; 162/181.1; 162/181.2; 162/181.6; 423/430; 423/432
(58) Field of Classification Search ............. 162/181.1, 162/181.2, 181.6; 106/465; 423/430, 432
See application file for complete search history.

(56) References Cited

U.S. PATENT DOCUMENTS

| | | | |
|---|---|---|---|
| 3,373,134 A | 3/1968 | Yasui et al. | |
| 5,397,619 A | 3/1995 | Kuroyama et al. | |

FOREIGN PATENT DOCUMENTS

| | | |
|---|---|---|
| EP | 1 323 674 | 7/2003 |
| JP | 43-3487 | 2/1968 |
| JP | 44-5330 | 3/1969 |
| JP | 44-14699 | 6/1969 |
| JP | 58-115022 | 7/1983 |
| JP | 9-156923 | 6/1997 |

*Primary Examiner*—Mark Halpern
(74) *Attorney, Agent, or Firm*—Flynn, Thiel, Boutell & Tanis, P.C.

(57) ABSTRACT

Silica-calcium carbonate composition particles having the characteristics of both synthetic silica and calcium carbonate are described along with paper having the particles internally filled therein and a method for making the particles.

In the carbonation reaction, which typically involves a step of forming calcium carbonate, while agitating a calcium hydroxide slurry, a mixed gas of carbon dioxide and air is introduced thereinto and synthetic silica, such as colloidal silica or the like, is added before the carbonation rate arrives at 95% but after commencement of the carbonation reaction, followed by further introduction of the mixed gas to continue the carbonation reaction and completion of the carbonation reaction at the time when the pH of the slurry reaches 7, thereby providing the composite particles.

1 Claim, 1 Drawing Sheet

SILICA-CALCIUM CARBONATE COMPOSITE PARTICLES

This application is a 371 of PCT/JP01/01614 filed on 2 Mar. 2001.

TECHNICAL FIELD

This invention relates to silica-calcium carbonate composite particles having both excellent characteristics of synthetic silica and excellent characteristics of calcium carbonate, paper wherein the particles are internally filled therein and/or coated thereon, and also to a method for making the particles. More particularly, the invention relates to silica-calcium carbonate composite particles having a novel structure, characterized in that synthetic silica is fixed on the surfaces of calcium carbonate particles as it is while keeping the characteristics of the synthetic silica that has good properties such as a high specific surface area, high gas absorbability, a high oil absorption and the like, and also to paper wherein the particles are internally filled therein and/or coated thereon, and a method for making the particles.

TECHNICAL BACKGROUND

With respect to calcium carbonate that is one of the constituents forming the composite particles of the invention, there are known ground calcium carbonate and precipitated calcium carbonate. The former ground calcium carbonate is a finely pulverized product of limestone which naturally occurs and has high whiteness, and can be made according to relatively simple processes such as pulverization, classification and the like. The particles have an irregular form inherent to a physically pulverized product and thus a wide size distribution, and can be widely used as a filler or pigment for plastics, rubbers and resins and also for paper-making while making use of their high whiteness and economy.

The latter synthetic calcium carbonate is chemically synthesized calcium carbonate. For the methods of preparing the particles, there are known a carbonation process wherein carbon dioxide is introduced into a calcium hydroxide (slaked lime) slurry for chemical precipitation, a calcium chloride soda process wherein the reaction between calcium chloride and sodium carbonate is used for the precipitation, a soda ash-lime process where the reaction between calcium hydroxide and sodium carbonate is used for the precipitation, and a water treating process wherein the reaction between calcium hydroxide and calcium bicarbonate is used for the precipitation.

Such known processes as mentioned above are now in use for the process of preparing precipitated calcium carbonate. In our country, a starting limestone material of good quality occurs richly, eventually leading to the production using a carbonation process in most cases. In the preparation of precipitated calcium carbonate, it is possible to control a particulate form, a particle size and the like within certain ranges by controlling the preparation conditions including a concentration of calcium in a starting slaked lime slurry, a temperature at which the carbonation reaction is carried out, a rate of carbonation and the like.

It is well known that the particles take various forms particularly including colloidal, cubic, spindle-shaped, columnar and the like forms, and these are, respectively, used for different main applications. More particularly, the colloidal calcium carbonate is in the form of colloidal particles having a particle diameter of 0.04~0.08 μm and has been used as a filler for plastics, rubbers, paints and the like. The cube-shaped calcium carbonate is in the form of cubic particles with a particle diameter of 0.1~0.2 μm and is excellent, particularly, as a pigment for paper-making.

The spindle-shaped calcium carbonate is in the form of spindle-shaped particles with a major axis of 0.5~5.0 μm and a minor axis of 0.1~1.0 μm and are widely utilized as a filler for paper-making. The columnar calcium carbonate is in the form of columnar particles having a major axis of 1.0~20 μm and a minor axis of 0.1~1.0 μm, and mention is made of its application as a pigment, filler for paper-making or the like.

This precipitated calcium carbonate is produced by relatively simple preparation process as set out hereinabove and has prominent properties with respect to physical stability, diversity, the economy in particulate form, whiteness and the like, thus being used in various industrial applications.

The synthetic silica that is the other constituent forming the composite particles of the invention is now described below. For industrial silica materials, mention is made of colloidal silica, silica gel, anhydrous silica, white carbon and the like, which are used in a variety of fields while making use of excellent characteristics such as a high specific surface area, high gas absorptivity, fineness, infiltration or adsorption power into fine interstices, high adhesion, high oil absorption, uniformity of particles, high dispersability and the like.

Of these, colloidal silica consists of amorphous silica, which is obtained by removing impurities from a silicic acid compound to provide a sol of silicic anhydride and controlling the pH and concentration to stabilize the sol and which has spherical, chain-shaped and irregular forms. These have been applied as a processability improver of a resin, a wax, a sizing agent, a quality improver of a latex, a binder, a printability improver for printing paper, a metal surface treating agent, or the like.

A silica gel consists of anhydrous silicic acid obtained by decomposing sodium silicate with an inorganic acid and has been used for applications as a desiccant for foods, medicines, fibers, gases or air, a catalyst or a carrier therefor, a filler for rubbers, or a thickening or precipitation inhibitor for paints or inks. Anhydrous silica is obtained by hydrolyzing silicon tetrachloride and is utilized for a filler or reinforcing agent for paints, inks, resins, rubbers and the like.

Among inorganic materials for industry, calcium carbonate and silica materials are those materials that are most widely employed, and, respectively, have excellent characteristics, also have demerits. For instance, where calcium carbonate is used as a filler for rubber, its surface is so inert as to be poor in affinity for rubber molecules physically and chemically, thus little reinforcing effect on rubber products is obtained.

When used as a pigment or filler for paper-making, particularly for printing paper, the carbonate is lower in ink absorption than synthetic silica, with the possibility that troubles may occur with respect to the ink setting property, strike-through of an ink and opacity of a printed portion. In addition, because of the poor resistance to an acid, it is difficult to use it in combination with an acidic substance such as in an acidic paper-making procedure using aluminum sulfate.

Moreover, where the silica material is employed as a pigment for paper-making, it causes a coating agent to be increased in viscosity, thus making it difficult to formulate in the coating agent at a high concentration. It has been indicated that upon use as a filler for rubber, the viscosity of the resultant rubber composition becomes very high.

Colloidal silica may produce problems with respect to the variations in the temperature, pH, concentration of an electrolyte of a solution, the long-term storage, the stability against organic solvents and the like. In addition, colloidal silica is more expensive than calcium carbonate, thus disenabling one to formulate the colloidal silica in a product in high concentration or use it in large amounts.

Hence, in order to solve or reduce the deficiencies of calcium carbonate, studies have been made from old on the techniques of making a composite product of calcium carbonate and silica and also on applications thereof, under which many proposals have been made.

For instance, Japanese Patent Publication No. Sho 60-72963 proposes a composite improved pigment wherein the surfaces of calcium carbonate particles are activated with an inorganic acid, and silicic acid or a silicate is reacted on the surfaces to form a covering layer of silicic acid or the silicate via $CaSiO_3$ formed by the reaction.

Japanese Patent Publication No. Hei 4-63007 proposes a method of making a specific type of composite powder made of a powder, such as of calcium carbonate and hydrous silicic acid, which is obtained according to a physical technique wherein a mixture of a powder, such as of calcium carbonate and hydrous silicic acid, is ground and which is provided with an ink-strike-through preventing property and is thus suitable as a filler for paper. Japanese Patent Publication No. Hei 11-107189 proposes a method of making composite particles wherein fine particles of calcium carbonate or the like are dispersed in an alkali silicate solution, to which a mineral acid is added under specific conditions to cause the fine particles of calcium carbonate or the like to be uniformly incorporated in the particles of the hydrous silicic acid.

Moreover, applications of the composite product of silica and calcium carbonate include, for example, a carrier for agricultural chemicals (Japanese Laid-open Patent Publication No. Sho 60-222402), a formulating agent for thermal paper (Japanese Laid-open Patent Application No. Sho 61-118287), a pigment for ink jet recording paper (Japanese Patent Publication No. Hei 8-1038), a filler for reinforcing rubber or the like (Japanese Laid-open Patent Application No. Hei 11-29319), and the like. In these publications, there may be exemplified preparation methods or structures different from those of the above-stated composite product.

For instance, the composite material set out in Japanese Laid-open Patent Application No. Sho 60-222402 is such that a metal such as Zn, Mg, Al or the like is caused to co-exist in the course of a carbonation reaction, thereby permitting the metal to co-exist in the resultant composite material, and the composed material described in Japanese Laid-open Patent Application No. Sho 61-118287 is one obtained by co-precipitation of sodium silicate and a water-soluble calcium compound, such as calcium hydroxide, through a carbonation reaction. The composition material of Japanese Patent Publication No. Hei 8-1038 is one obtained by sodium silicate and calcium chloride, followed by carbonation reaction.

These techniques can achieve an effect to some extent in respect of the fact that the defects of calcium carbonate are covered up while making use of the characteristics inherent to silica. However, except for the physical technique disclosed in Japanese Laid-open Patent Application No. Hei 4-63007 or Japanese Laid-open Patent Application No. Hei 11-29319, the composite materials are ones wherein silica is precipitated on the surface of calcium carbonate in a system for coverage with the silica film, calcium carbonate and silica are subjected to co-precipitation, and calcium carbonate is formed, followed by carbonation. There are no cases such that fine particles of silica are added to from outside the system to permit the fine particles of silica to be attached to and fixed on the surfaces of the calcium carbonate.

Problems to Solve

Under the circumstances stated hereinabove, the formation of the composite material by the chemical techniques known up to now differs from the manner of fixing silica particles on the surfaces of calcium carbonate particles as they are. Eventually, it cannot be expected that the excellent characteristics of fine particles of silica are imparted thereto, and thus, such characteristics can be shown only within a limited range.

We have made intensive studies on the formation of a composite material of synthetic silica and calcium carbonate for the purpose of realizing the high functionality of calcium carbonate, with the result that the composite material of the invention can be developed.

Accordingly, the invention has for the problem to be solved the provision of novel silica-calcium carbonate composite particles without a sacrifice of excellent characteristics of silica, such as a high specific surface area, high gas adsorbability, fineness, high infiltration into fine interstices and high adsorption, high adhesion, uniformity of particles, high dispersability and the like, and excellent characteristics of calcium carbonate, a paper sheet having the particles internally filled therein or coated therewith, and a method for making the particles.

More particularly, the invention has for its object the provision of novel silica-calcium carbonate composite particles having excellent characteristics inherent to both synthetic silica and calcium carbonate, a paper sheet having the particles internally filled therein and/or coated therewith, and a method for making the particles.

DISCLOSURE OF THE INVENTION

The invention contemplates the provision of novel silica-calcium carbonate composite particles, a paper sheet in which the particles are internally filled therein and/or coated thereon, and a method for making the particles. The composite particles are characterized in that the fine particles of synthetic silica are added before completion of the carbonation reaction so that the fine particles of synthetic silica having an average size ranging 1 nm ~100 nm are attached to and fixed on the surfaces of calcium carbonate.

The paper having the particles internally filled therein is one wherein at least a part of a filler is made of the composite particles by mixing the composite particles with pulp and other chemicals for paper-making upon preparation of a paper stock in the course of a paper-making step, followed by making paper from the stock as a starting material. The paper coated with the particles means paper wherein at least a part of a pigment contained in a coating layer of the coated paper is made of the composite particles, and is made by mixing the composite particles with a binder and other pigments upon preparation of a coating in the course of a coating step, followed by applying the coating on base paper.

The method for making silica-calcium carbonate composite particles is characterized in that fine particles of synthetic silica are added to in the course of a carbonation reaction which is a step of forming calcium carbonate, followed by completion of the carbonation reaction.

In the invention, since the fine particles of synthetic silica are fixed on the surfaces of calcium carbonate, the composite material has the excellent characteristics of both without lowering the characteristics of synthetic silica, such as a high specific surface area, high gas absorbability, infiltration into fine interstices and adsorption, high adhesion, high oil absorption, particulate uniformity, high dispersability and the like, and also the characteristics of calcium carbonate.

BEST MODE FOR CARRYING OUT THE INVENTION

Figure 1:
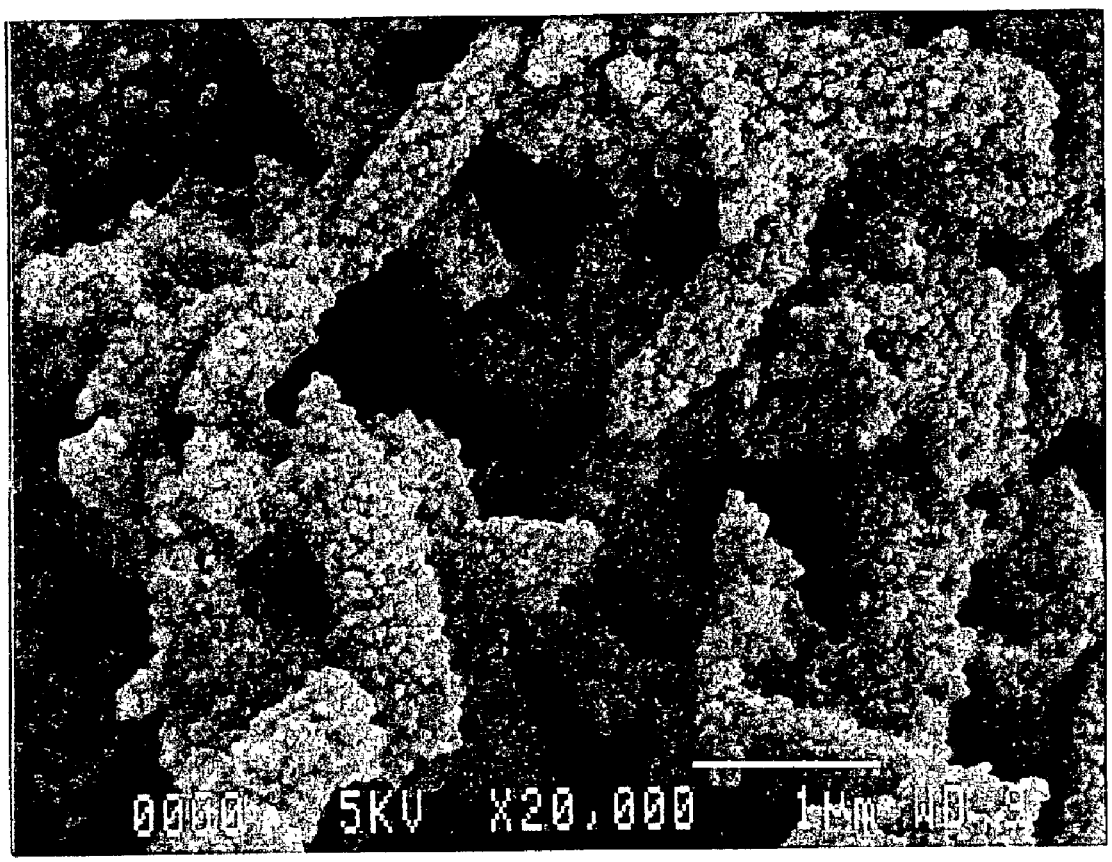
FIG. 1 is a scanning electron microscopic (SEM) photograph (×20,000) showing a particulate structure of silica-calcium carbonate composite particles obtained in Example 1.

The invention is now described in detail including the best mode for carrying out the invention, which should not be construed as limiting the invention thereto. Thus, it is to be understood that the true spirit and scope of the invention is as defined in the appended claims.

The silica-calcium carbonate composite particles of the invention are prepared by adding synthetic silica particles in the course of a carbonation reaction forming calcium carbonate as set forth hereinbefore and completing the carbonation reaction.

The calcium carbonate, which is a first component of the two components constituting the composite particles of the invention, should preferably consist of precipitated calcium carbonate and is not limited thereto. For instance, there may be used one which includes precipitated calcium carbonate as a surface portion and ground calcium carbonate as a core portion. In this connection, a major proportion may be made either of ground calcium carbonate or of synthetic calcium carbonate. These may be arbitrarily selected depending on the characteristics required for the intended silica-calcium carbonate composite particles.

It is known that precipitated calcium carbonate has various shapes and sizes of particles, and especially, when such precipitated calcium carbonate is used as calcium carbonate, the shape and size of precipitated calcium carbonate can be selected depending on the characteristics required for the intended silica-calcium carbonate composite particles, thus being suited for achieving the purposes of the invention. Among them, spindle-shaped calcium carbonate is preferred in view of the fact that not only can it be prepared in the vicinity of normal temperatures and the control of preparation conditions is relatively easy, but also the efficiency of adhesion of synthetic silica is most excellent in the practice of the invention.

For the synthetic silica, which is the other constituent of the composite particles of the invention, silicas which are artificially prepared through some chemical reactions may be used without limitation, but except naturally occurring silica, and include colloidal silica, silica gel, anhydrous silica, white carbon and the like. These silicas, i.e. silica materials, have been widely used in various fields while making use of excellent characteristics thereof such as a high specific surface area, high gas absorbability, fineness, high infiltration into fine interstices and adsorption, high adhesion, high oil absorption, uniformity of particles, high dispersability and the like.

Among these synthetic silicas, colloidal silica is made of amorphous silica having a round, chain-like, irregular or the like form and obtained by removing impurities from a silicic acid compound to provide a sol of silicic acid anhydride and controlling its pH and concentration to stabilize the sol. Silica gel consists of hydrous silicic acid obtained by decomposing sodium silicate with an inorganic acid. Anhydrous silica is one obtained by hydrolyzing silicon tetrachloride. White carbon is made of finely powdered hydrous silicic acid obtained by decomposing an organosilicon compound or sodium silicate.

As having stated hereinbefore, various types of synthetic silicas are usable in the practice of the invention without limitation. In order to obtain silica-calcium carbonate composite particles of the invention, synthetic silica suited therefor should be selected, and it is necessary to use synthetic silica whose average size of the primary particles is in the range of 1~100 nm. In respect of the adsorption on and fixing to calcium carbonate, colloidal silica and anhydrous silica are most preferred among various silica materials. Anyway, the selection should depend on the characteristics required for intended silica-calcium carbonate composite particles.

Next, the method for making silica-calcium carbonate composite particles of the invention is described in detail. The silica-calcium carbonate composite particles of the invention are made by adding synthetic silica in the course of the carbonation reaction of the calcium in the step of forming calcium carbonate. The calcium source includes slaked lime (calcium hydroxide) obtained by hydrating the quick lime (calcium oxide) prepared by firing limestone, calcium chloride, calcium nitrate or the like. For the carbonation, there may be used a carbon dioxide-containing gas such as an exhaust gas discharged upon the preparation of quick lime as mentioned above, pure carbon dioxide, and soluble carbonates such as sodium carbonate, sodium bicarbonate, calcium bicarbonate and the like.

The addition of synthetic silica may be before the beginning of the carbonation reaction or at a time between the commencement and completion of the carbonation reaction, preferably before the carbonation rate is up to 95%. Especially, with the formation of composite particles with synthetic calcium carbonate, it is preferred in view of synthetic silica being strongly, efficiently attached to and fixed on the surfaces of the calcium carbonate that the addition is in the course of the carbonation reaction and at the time after the formation of crystal nuclei of calcium carbonate commences but before the carbonation rate is up to 95%.

The commencement with respect to the formation of crystal nuclei of calcium carbonate can be readily determined by continuously measuring the electrical conductivity of a calcium hydroxide slurry when using a carbonation process. With colloidal calcium carbonate, for instance, a point of time at which the primary drop of electrical conductivity is converted to rise is coincident with the time of commencement for the formation of crystal nuclei of calcium carbonate ("Gypsum and Lime", No. 194, pp. 3–12, 1981). In case of spindle-shaped calcium carbonate, a small primary drop of electrical conductivity can also be recognized at the initial stage of the carbonation reaction.

Where the preparation of silica calcium carbonate particles is by methods other than the carbonation process, e.g., a soluble carbonate such as sodium carbonate is used for the carbonation reaction, the nuclei addition, so that the formation of the crystal nuclei coincides with the commencement of carbonation.

The carbonation rate used herein is expressed according to the following equation.

Carbonation rate=(weight of calcium in calcium carbonate formed by the carbonation reaction÷total weight of calcium existing in the reaction system)×100 The amount of added synthetic silica is not critical and can be determined depending on the extent of synthetic silica-derived characteristics required for silica-calcium carbonate composite particles. Preferably, the amount is at 0.01 g or over per 100 g of calcium carbonate. If the amount is smaller than 0.01 g, few characteristics of synthetic silica are shown, and the resultant product has almost the same properties as calcium carbonate per se, so that the purposes of the invention may not be achieved in some cases. Although the upper limit is not critical, limitation is placed on the amount of deposition by virtue of the specific surface area of calcium carbonate, under which if the amount of synthetic silica is in excess, free synthetic silica increases in amount. This entails not only poor economy, but also the drawbacks of synthetic silica being emphasized in some cases.

Ground calcium carbonate may be used as the calcium carbonate for the silica-calcium carbonate composite particles of the invention. In this case, it is necessary that a carbonic acid source be introduced into a ground calcium carbonate slurry after addition of a calcium source in order to carry out the carbonation reaction, like the formation of synthetic calcium carbonate, during which synthetic silica is added thereto to obtain silica-calcium carbonate composite particles.

The addition of synthetic silica may be before the carbonation reaction, during the time of or immediately after commencement of the reaction till completion thereof, preferably during a time at which the carbonation rate of a calcium source such as calcium hydroxide, calcium chloride, calcium nitrate or the like, is added to the ground calcium carbonate slurry, ranges from 0~95%.

The carbonation rate used herein is expressed according to the following equation.

Carbonation rate=(weight of calcium in calcium carbonate formed by the carbonation reaction÷weight of calcium in calcium source added to ground calcium carbonate slurry)×100

The amount of added synthetic silica is not critical and can be determined depending on the extent of synthetic silica-derived characteristics required for silica-calcium carbonate composite particles. Preferably, the amount is at 0.01 g or over per 100 g of calcium carbonate at the point of time when the carbonation is completed, like the case using synthetic calcium carbonate. According to the above-stated reaction procedure, there can be prepared silica-calcium carbonate composite particles of the invention wherein synthetic silica having a size of 1~100 nm are attached to and fixed on the surfaces of calcium carbonate particles.

Further, the method for making silica-calcium carbonate composite particles of the invention can be readily carried out by the novel and simple procedure wherein synthetic silica is added in the step of forming calcium carbonate.

The resultant silica-calcium carbonate composite particles have the features including, aside from excellent characteristics of calcium carbonate, characteristics inherent to silica, such as high oil absorption, affinity for plastics, rubbers and the like, gas adsorbability, catalytic activity and the like.

Accordingly, where the silica-calcium carbonate composite particles of the invention are used as a filler or pigment, effects of improving printability of printing paper and improving strength of rubber and plastics can be expected.

It can also be expected that the composite particles exhibit excellent performances as highly functional calcium carbonate in a wide variety of fields, such as impartment of an acid-proofing to calcium carbonate, utilization as a carrier caused by the formation of porous surfaces of calcium carbonate, removal by adsorption of acidic substances, harmful gases of calcium carbonate based on the catalytic action of silica or improvement in the removability, and the like.

In the practice of the invention since fine particles of synthetic silica are fixed on the surfaces of calcium carbonate, the composite product has the excellent characteristics of both without lowering the characteristics of synthetic silica, such as a high specific surface area, high gas adsorbability, fineness, infiltration power into fine interstices or adsorption power, high adhesion, high oil absorption, uniformity of particles, high dispersability and the like, and the characteristics of calcium carbonate.

The silica-calcium carbonate composite particles of the invention have such excellent characteristics as set out hereinabove and show an excellent performance when applied to paper seats wherein the composite particles are internally filled therein or coated thereon.

The paper seats having the composite particles internally filled therein are ones wherein at least a part of the fillers contained therein is made of the composite particles. The composite particles are mixed with pulp and other chemicals for paper-making upon preparation of a paper stock in a paper-making process, and the paper stock is subjected to paper-making to provide the paper. The paper coated with the particles is one wherein at least part of the pigments contained in a coating layer of coated paper is made of the composite particles, and is made by mixing with a binder and other types of pigments upon preparation of a coating solution in a coating step and applying the coating solution onto a paper stock. The paper which is internally filled or coated with these silica-calcium carbonate composite particles is excellent in ink receptivity due to the high oil absorption characteristics of the composite particles, thus being very effective in preventing a printed portion from striking-through and improving printing capacity.

The method for making silica-calcium carbonate composite particles is characterized in that in the course of a carbonation reaction, which is the step of forming calcium carbonate, fine particles of synthetic silica is added and the carbonation reaction is subsequently completed.

In the practice of the invention, the fine particles of synthetic silica are fixed on the surfaces of the calcium carbonate, so that the resultant composite product has the excellent characteristics of both without lowering the characteristics of the synthetic silica, such as a high specific surface area, high gas adsorbability, fineness, infiltration power into fine interstices or adsorption power, high adhesion, high oil absorption, uniformity of particles, high dispersability and the like, and the characteristics of calcium carbonate.

EXAMPLES AND COMPARATIVE EXAMPLES

The invention is more particularly described by way of examples and comparative examples, which should not be construed as limiting the invention thereto. As a matter of course, the invention is defined only by the appended claims.

Example 1

While agitating 2.0 kg of a calcium hydroxide slurry whose temperature was controlled at 30° C. and which had a concentration of 7.4 wt %, a mixed gas of carbon dioxide having a concentration of 25 vol % and air was fed into the slurry at a rate of 1.2 liters/minute per 100 g of calcium hydroxide, thereby causing a carbonation reaction to commence. At the time when the carbonation rate reached 20%, 300 g (calculated as the weight of $SiO_2$ and corresponding to 30 g per 100 g of calcium carbonate formed) of a 20 wt % solution of colloidal silica (with an average particle size of 45 nm and a spherical shape) was added and the mixed gas was subsequent fed so as to continue the carbonation reaction, followed by completing the carbonation reaction at the time when the pH of the slurry arrived at 7.

According to observation through a scanning electron microscope (SEM), the resultant product was made of silica-calcium carbonate composite particles wherein the colloidal silica was attached to and fixed on the surfaces of spindle-shaped calcium carbonate particles having a major axis of 2.0 µm and a minor axis of 0.4 µm. About 90% of the surfaces of the spindle-shaped calcium carbonate was covered with the colloidal silica, with the particles made solely of silica being recognized only in a slight amount. These are as shown in FIG. 1.

Example 2

While agitating 2.0 kg of a calcium hydroxide slurry whose temperature was controlled at 30° C. and which had a concentration of 7.3 wt %, a mixed gas of carbon dioxide having a concentration of 25 vol % and air was fed at a rate of 1.2 liters/minute per 100 g of calcium hydroxide, thereby causing a carbonation reaction to commence. At the time when the carbonation rate reached 80%, 300 g (calculated as the weight of $SiO_2$ and corresponding to 30 g per 100 g of calcium carbonate formed) of a 20 wt % colloidal silica (with an average particle size of 45 nm and a spherical shape) solution was added, and the mixed gas was further fed so as to continue the carbonation reaction, followed by completing the carbonation reaction at the time when the pH of the slurry arrived at 7.

According to observation through a SEM, the resultant product was made of silica-calcium carbonate composite particles wherein the colloidal silica was attached to and fixed on the surfaces of spindle-shaped calcium carbonate particles having a major axis of 2.0 µm and a minor axis of 0.4 µm. About 40% of the surfaces of the spindle-shaped calcium carbonate was covered with the colloidal silica, with the particles made solely of silica being recognized therearound only in a very small amount.

Example 3

While agitating 2.0 kg of a calcium hydroxide slurry whose temperature was controlled at 35° C. and which had a concentration of 5.6 wt %, 150 g (calculated as the weight of $SiO_2$ and corresponding to 20 g per 100 g of calcium carbonate formed) of a 20 wt % colloidal silica (with an average particle size of 20 nm and a round shape) solution was added. Subsequently, pure carbon dioxide gas having a concentration of 100 vol % was fed from a gas cylinder at a rate of 0.3 liters/minute per 100 g of the calcium hydroxide, thereby causing a carbonation reaction to start, and the carbonation reaction was stopped when the pH of the slurry arrived at 7.

According to observation through a SEM, the resultant product was made of silica-calcium carbonate composite particles wherein the colloidal silica was attached to and fixed on the surfaces of spindle-shaped calcium carbonate particles having a major axis of 1.5~2.0 µm and a minor axis of 0.3~0.4 µm. All the surfaces of the spindle-shaped calcium carbonate were covered with the colloidal silica, with particles made solely of silica not being recognized at all.

Example 4

While agitating 2.0 kg of a calcium hydroxide slurry whose temperature was controlled at 70° C. and which had a concentration of 11.1 wt %, a mixed gas of carbon dioxide having a concentration of 25 vol % and air was fed at a rate of 0.3 liters/minute per 100 g of calcium hydroxide, thereby causing a carbonation reaction to commence. At the time when the carbonation rate reached 50%, 75 g (calculated as the weight of $SiO_2$ and corresponding to 5 g per 100 g of calcium carbonate formed) of a 20 wt % colloidal silica (in an elongated form having a width of 15 nm and a major axis of 100 nm) solution was added, and the mixed gas was further fed so as to continue the carbonation reaction, followed by completing the carbonation reaction at the time when the pH of the slurry arrived at 7.

According to observation through a SEM, the resultant product was made of silica-calcium carbonate composition particles wherein the colloidal silica was attached to and fixed on the surfaces of column-shaped calcium carbonate particles having a major axis of 1.5~2.0 µm and a minor axis of 0.2 µm. About 50% of the surfaces of the column-shaped calcium carbonate was covered with the colloidal silica, with particles made solely of silica being recognized only in a slight amount.

Example 5

While agitating 2.0 kg of a calcium hydroxide slurry whose temperature was controlled at 10° C. and which had a concentration of 5.3 wt %, a pure gas made of carbon dioxide having a concentration of 100 vol % was fed from a gas cylinder at a rate of 1.0 liter/minute per 100 g of calcium hydroxide, thereby causing a carbonation reaction to commence. At the time when the carbonation rate reached 80%, 300 g (calculated as the weight of $SiO_2$ and corresponding to 42 g per 100 g of calcium carbonate formed) of a 20 wt % colloidal silica (with an average particle size of 20 nm and a spherical shape) solution was added, and the mixed gas was further fed so as to continue the carbonation reaction, followed by completing the carbonation reaction at the time when the pH of the slurry arrived at 7. This slurry was heated to 60° C. and maintained at 60° C. over 3 days.

According to observation through a SEM, the resultant product was made of silica-calcium carbonate composite particles wherein the colloidal silica was attached to and fixed on the surfaces of colloidal calcium carbonate particles. Although the particles made solely of the colloidal silica were found around the composite particles, about 40% of the surface of the colloidal calcium carbonate was covered with the colloidal silica.

Example 6

While agitating 2.0 kg of a calcium hydroxide slurry whose temperature was controlled at 30° C. and which had a concentration of 7.5 wt %, a mixed gas of carbon dioxide having a concentration of 25 vol % and air was fed at a rate of 1.2 liters/minute per 100 g of calcium hydroxide, thereby causing a carbonation reaction to commence. At the time when the carbonation rate reached 20%, 100 g (calculated as the weight of $SiO_2$ and corresponding to 2 g per 100 g of calcium carbonate formed) of a 4 wt % anhydrous silica (Aerosil, with an average particle size of 12 nm) solution was added, and the mixed gas was further fed so as to continue the carbonation reaction, followed by completing the carbonation reaction at the time when the pH of the slurry arrived at 7.

According to observation through a SEM, the resultant product was made of silica-calcium carbonate composite particles wherein the anhydrous silica was attached to and fixed on the surfaces of spindle-shaped calcium carbonate particles having a major axis of 2.0 µm and a minor axis of 0.4 µm. About 30% of the surfaces of the spindle-shaped calcium carbonate was covered with the colloidal silica, with the particles made solely of anhydrous silica being not recognized at all.

Example 7

While agitating 2.0 kg of a ground calcium carbonate (with an average particle size of 5.1 µm and a specific surface area of 11.300 cm/g) slurry which had a concentration of 20 wt %, 50 g of slaked lime for industry was added and, after controlling a slurry temperature at 70° C., a mixed gas of carbon dioxide having a concentration of 25 vol % and air was fed at a rate of 0.1 liter/minute per 100 g of calcium hydroxide, thereby causing a carbonation reaction to commence. At the time when the carbonation rate reached 40%, 200 g (calculated as the weight of $SiO_2$ and corresponding to 10 g per 100 g of calcium bicarbonate) of a 20 wt % colloidal silica (with an average particle size of 20 nm) solution was added, and the mixed gas was further fed so as to continue the carbonation reaction, followed by completing the carbonation reaction at the time when the pH of the slurry arrived at 7.

According to observation through a SEM, the resultant product was made of silica-calcium carbonate composite particles wherein about 80% of the surfaces of the ground calcium carbonate was attached and fixed thereon with the colloidal silica particles. Although particles made solely of silica were recognized, the amount was only slight. It was recognized that the calcium carbonate formed through the carbonation reaction of calcium hydroxide formed fresh particles with a size of 0.04~0.06 µm and attached to the surfaces of the ground calcium carbonate. Besides, the surface profile of the ground calcium carbonate particles after completion of the reaction was changed into a relatively smooth profile in comparison with an irregular, fragmentary shape prior to the reaction, from which it was assumed that the calcium carbonate was crystallized on the surfaces of the calcium bicarbonate.

Example 8

A reagent-grade sodium carbonate solution having a concentration of 10 wt % was dropped in 2.0 kg of a reagent-grade calcium chloride solution, controlled at 25° C. and having a concentration of 5.0 wt %, at a rate of 8.0 ml/minute, thereby causing a carbonation reaction to start. At the time when the carbonation rate reached 15%, 100 g (calculated as the weight of $SiO_2$ and corresponding to 22 g per 100 g of calcium carbonate formed) of a 20 wt % colloidal silica (in an elongated form having a minor axis of 15 nm and a major axis of 100 nm) solution was added, and the sodium carbonate solution was further fed so as to continue the carbonation reaction, followed by completing the carbonation reaction at the time when the pH of the slurry arrived at 9.

According to observation through a SEM, the resultant product was made of silica-calcium carbonate composite particles wherein the colloidal silica was attached to and fixed on substantially all the surfaces of the calcium carbonate round particles with a particle size of 10~20 µm, with no particles made solely of silica being observed.

Example 9

80 g of reagent-grade calcium chloride was added to 2.0 kg of a ground calcium carbonate (with an average particle size of 5.1 µm and a specific surface area of 11,300 cm/g) slurry, followed by controlling at 25° C. While agitating the slurry, a 10 wt % solution of reagent-grade sodium carbonate was dropped at a rate of 8.0 ml/minute, thereby causing carbonation to start. At the time when the carbonation rate reached 10%, 100 g (calculated as the weight of $SiO_2$ and corresponding to 5 g per 100 g of ground calcium carbonate) of a 20 wt % colloidal silica (in an elongated form having a minor axis of 15 nm and a major axis of 100 nm) solution was added, and the sodium carbonate solution was further fed so as to continue the carbonation reaction, followed by completing the carbonation reaction at the time when the pH of the slurry arrived at 9.

According to observation through a SEM, the resultant product was made of silica-calcium carbonate composite particles wherein the colloidal silica particles were attached to and fixed on about 70% of the surfaces of the calcium bicarbonate having a particle size of 0.2~20 µm, with no particles made solely of silica being observed. It was confirmed that the calcium carbonate formed through the carbonation reaction of calcium chloride formed fresh particles having a size of 0.04~0.06 µm and deposited on the surfaces of the ground calcium carbonate. Besides, the surface profile of the calcium bicarbonate particles after completion of the reaction was changed into a relatively smooth profile in comparison with an irregular, fragmentary shape prior to the reaction, from which it was assumed that the calcium carbonate was crystallized on the surfaces of the calcium bicarbonate.

Comparative Example 1

A mixed gas of carbon dioxide having a concentration of 25 vol % and air was introduced into 2.0 kg of a 7.8 wt % slurry of calcium hydroxide, controlled at 30° C., at a rate of 1.2 liters/minute per 100 g of calcium hydroxide to cause a carbonation reaction to start. At the time when the carbonation rate reached 20%, 63 g (calculated as the weight of $SiO_2$ and corresponding to 30 g per 100 g of calcium carbonate formed) of fine powder (naturally occurring quartz pulverized to an extent that an average particle size was at 2.8 µm) of silica sand, which is natural silica, was added, and the mixed gas was further introduced so as to continue the carbonation reaction, followed by completing the carbonation reaction. Observation of the resultant product through a SEM revealed that no natural silica was found on the surfaces of spindle-shaped calcium carbonate particles having a major axis of 2.0 µm and a minor axis of 0.4 µm, but independent particles were formed.

Comparative Example 2

A mixed gas of carbon dioxide having a concentration of 25 vol % and air was introduced into 2.0 kg of a 7.4 wt % slurry of calcium hydroxide, controlled at 30° C., at a rate of 1.2 liters/minute per 100 g of calcium hydroxide to cause a carbonation reaction to start, followed by completing the carbonation reaction when the pH of the slurry arrived at 7.

While agitating the calcium carbonate slurry, 300 g (calculated as the weight of $SiO_2$ and corresponding to 30 g per 100 g of calcium carbonate formed) of a 20 wt % solution of colloidal silica (with an average size of 45 nm and a round shape) was added, and the mixed gas was again introduced over 30 minutes. Observation of the resultant product through SEM revealed that no colloidal silica was found on the surfaces of spindle-shaped calcium carbonate particles having a major axis of 2.0 μm and a minor axis of 0.4 μm, but independent particles were formed.

Comparative Example 3

While agitating 2.0 kg of a calcium bicarbonate (with an average particle size of 5.1 μm and a specific surface area of 11.300 cm/g) slurry which had a concentration of 20 wt %, 200 g (calculated as the weight of $SiO_2$ and corresponding to 10 g per 100 g of calcium bicarbonate formed) of a 20 wt % solution of colloidal silica (with an average size of 20 nm) was added, and a mixed gas of carbon dioxide having a concentration of 25 vol % and air was fed over 30 minutes. Observation of the resultant product through a SEM revealed that no colloidal silica was found on the surfaces of the calcium bicarbonate particles, but was observed as independent discrete particles.

The composite particles of the invention has an excellent oil absorption as stated hereinbefore. In order to prove this, an oil absorption measuring test was carried out using the silica-calcium carbonate composite particles made in Example 1 and the like. The results are shown in Table 1. From the results of the test, it will be seen that the composite particles of the invention have a higher oil absorption than the particles of calcium carbonate alone or a mixture of calcium carbonate and silica. It will be noted that the oil adsorption measuring test was effected according to "JIS K 5101".

TABLE 1

| Sample | Oil Absorption (ml/100 g) |
|---|---|
| Composite particles of Example 1 | 65.0 |
| Mixture of calcium carbonate and silica | 51.5 |

TABLE 1-continued

| Sample | Oil Absorption (ml/100 g) |
|---|---|
| Spindle-shaped calcium carbonate | 45.0 |

INDUSTRIAL UTILITY

As stated hereinbefore, the silica-calcium carbonate composite particles of the invention are ones wherein synthetic silica having an average particle size of 1~100 μm is attached to and fixed on the surfaces of calcium carbonate and have both the excellent characteristics of silica and excellent characteristics of calcium carbonate. The making method is a novel and simple technique wherein synthetic silica is added in the course of a carbonation step of calcium carbonate, and can be readily carried out.

Where the silica-calcium carbonate composite particles of the invention are used as a filler or pigment in various fields, not only the effects of improving the printability of printing paper and improving the strength of rubbers and plastics are obtained, but also excellent performance as a calcium carbonate of high functionality in wide fields can be expected including impartment of an acid resistance to calcium carbonate, utilization as a carrier caused by establishing porous surfaces of calcium carbonate, removal by adsorption of acidic substances and harmful gases with calcium carbonate based on the catalyst action of silica or improvement in the removability, and the like.

The invention claimed is:

1. A method of making silica-calcium carbonate composite particles, said method comprising the steps of:
    conducting a carbonation reaction in a reaction system in which crystal nuclei of calcium carbonate are formed;
    adding colloidal or anhydrous silica to the reaction system until the carbonation reaction is about 95% complete; and
    completing the carbonation reaction to form the silica-calcium carbonate composite particles in which fine particles of silica having an average size of from 1 to 100 nm are attached to and affixed on the outer surface of calcium carbonate particles.

* * * * *